(12) United States Patent
Caldwell et al.

(10) Patent No.: US 6,325,842 B1
(45) Date of Patent: Dec. 4, 2001

(54) METHOD AND APPARATUS FOR AERATING

(76) Inventors: Dean A. Caldwell, P.O. Box 546, Deridder, LA (US) 70634; Gary R. Arnold, P.O. Box 156, Wisner, LA (US) 71378

( * ) Notice: Subject to any disclaimer, the term of this patent is extended or adjusted under 35 U.S.C. 154(b) by 0 days.

(21) Appl. No.: 09/538,643

(22) Filed: Mar. 30, 2000

Related U.S. Application Data (60) Provisional application No. 60/127,962, filed on Apr. 6, 1999.

(51) Int. Cl.[7] ............................... B01D 19/00; B01F 3/04
(52) U.S. Cl. ............................ 95/263; 96/202; 261/28; 261/76; 261/84; 261/120; 210/242.2
(58) Field of Search .......................... 95/159, 160, 172, 95/185, 246, 248, 261, 263, 266; 96/195, 202, 203, 216, 283, 284, 287, 322, 323, 334, 351, 368; 261/28, 30, 34.1, 76, 78.2, 84, 91, 92, 115, 120, DIG. 71, DIG. 75, DIG. 79, DIG. 19; 210/170, 188, 242.2

(56) References Cited

U.S. PATENT DOCUMENTS

| | | | |
|---|---|---|---|
| 3,322,410 | * 5/1967 | Ahlenius | 261/92 |
| 3,653,641 | * 4/1972 | Eron | 210/242.2 |
| 4,409,107 | * 10/1983 | Busch | 261/92 |
| 4,441,452 | 4/1984 | Strain, Jr. | 119/3 |
| 4,514,343 | 4/1985 | Cramer et al. | 261/37 |
| 4,522,151 | * 6/1985 | Arbisi et al. | 261/DIG. 75 |
| 4,587,064 | * 5/1986 | Blum | 261/120 |
| 4,710,325 | 12/1987 | Cramer et al. | 261/24 |
| 5,078,923 | * 1/1992 | Durda et al. | 261/120 |
| 5,118,450 | * 6/1992 | Chiu | 261/120 |
| 5,207,875 | * 5/1993 | Zapka et al. | 95/263 |
| 5,320,068 | 6/1994 | Redditt | 119/226 |
| 5,354,457 | * 10/1994 | Becchi | 210/170 |
| 5,425,874 | 6/1995 | Gass | 210/150 |
| 5,510,022 | * 4/1996 | Mullis | 210/170 |
| 5,744,072 | * 4/1998 | Karliner | 261/120 |
| 5,868,091 | * 2/1999 | Gross et al. | 210/242.2 |
| 5,893,337 | 4/1999 | Sevic | 119/215 |
| 5,942,161 | * 8/1999 | Pate | 261/92 |

* cited by examiner

Primary Examiner—Duane Smith
Assistant Examiner—Jason M. Greene
(74) Attorney, Agent, or Firm—David L. Ray (57) ABSTRACT

The present invention is a method and apparatus for aerating liquids including pumping liquids to be aerated into a hollow manifold, providing nozzles on the manifold and openings in the top of the manifold for spraying the liquids to be aerated therefrom, swirling the liquids in a spiral direction prior to the liquids reaching the nozzles, injecting air under pressure into the nozzles prior to discharge of the liquids to be aerated from the nozzles, and discharging the liquids through the nozzles and the openings from the interior of the manifold to the exterior of the manifold.

20 Claims, 7 Drawing Sheets

METHOD AND APPARATUS FOR AERATING

CROSS-REFERENCE TO RELATED APPLICATIONS

This application claims the benefit of the filing date and priority of provisional application Ser. No. 60/127,962 filed Apr. 6, 1999.

BACKGROUND OF THE INVENTION

1. Field of the Invention

The present invention relates to aeration of bodies of water or other liquids such as ponds, lagoons, and the like.

2. Description of the Related Art

Methods and apparatus for aerating ponds, lagoons, basins, reservoirs and other bodies of water or other liquid are known in the art. Exemplary of the apparatus and methods for aerating bodies of water are disclosed in the following U.S. Pat. Nos.: 4,441,452; 4,514,343; 4,710,325; 5,320,068; 5,425,874; and 5,893,337.

It is an object of the present invention to provide a method and apparatus for raising the dissolved oxygen level of a body of water or other liquid.

It is an additional object of the invention to provide a method and apparatus for increasing the movement of the liquid in a body of water or other liquid.

It is a further object of the invention to provide a method and apparatus for removing hydrogen sulfide gas, nitrogen, ammonia, carbon dioxide, and methane gas from a body of water or other liquid.

SUMMARY OF THE INVENTION

A method and apparatus for aerating ponds, lagoons, basins, reservoirs and other bodies of water and other liquids. The method and apparatus of the invention may be used in water treatment, waste water treatment, industrial applications, aquaculture, and agricultural applications. The method and apparatus of the invention raises the amount of dissolved oxygen in a body of water or other liquid, increases the water movement in the body of water or other liquid, and removes hydrogen sulfide gas, nitrogen, ammonia, carbon dioxide, methane gas and other from a body of water or other liquid in which the invention is employed.

The present invention includes pumping liquids to be aerated into a hollow manifold, providing nozzles on the manifold and openings in the top of the manifold for spraying the liquids to be aerated therefrom, swirling the liquids in a spiral direction prior to the liquids reaching the nozzles, injecting air under pressure into the nozzles prior to discharge of the liquids to be aerated from the nozzles, and discharging the liquids through the nozzles and the openings from the interior of the manifold to the exterior of the manifold.

DESCRIPTION OF THE PREFERRED EMBODIMENTS

Referring now to the drawings, and in particular to FIGS. 1, 9, 10, 14 and 15, the aeration apparatus of the invention is generally indicated by the numeral 20. Aeration apparatus 20 can be seen to have two generally rectangular air-tight parallel floats or pontoons generally indicated by the numerals 22 and 24 on either side of the aeration apparatus 20. Pontoons 22 and 24 float on the surface of the water 25 or other liquid in a pond or reservoir which is being aerated by aeration apparatus 20.

Pontoons 22 and 24 each have rectangular top walls 22*a* and 24*a* respectively, rectangular bottom walls 22*b* and 24*b*, respectively, rectangular inner walls 22*c* and 24*c*, respectively, and outer side walls 22*d* and 24*d*, respectively. Pontoons 22 and 24 also each have rectangular front end walls 22*e* and 24*e*, respectively, and rectangular rear end walls 22*f* and 24*f*, respectively.

Pontoons 22 and 24 are connected together by beam 26 and beam 28. Beams 26 and 28 are preferably welded or bolted at each end thereof to the inner walls 22*c* and 24*c* of pontoons 22 and 24.

Figure 1:
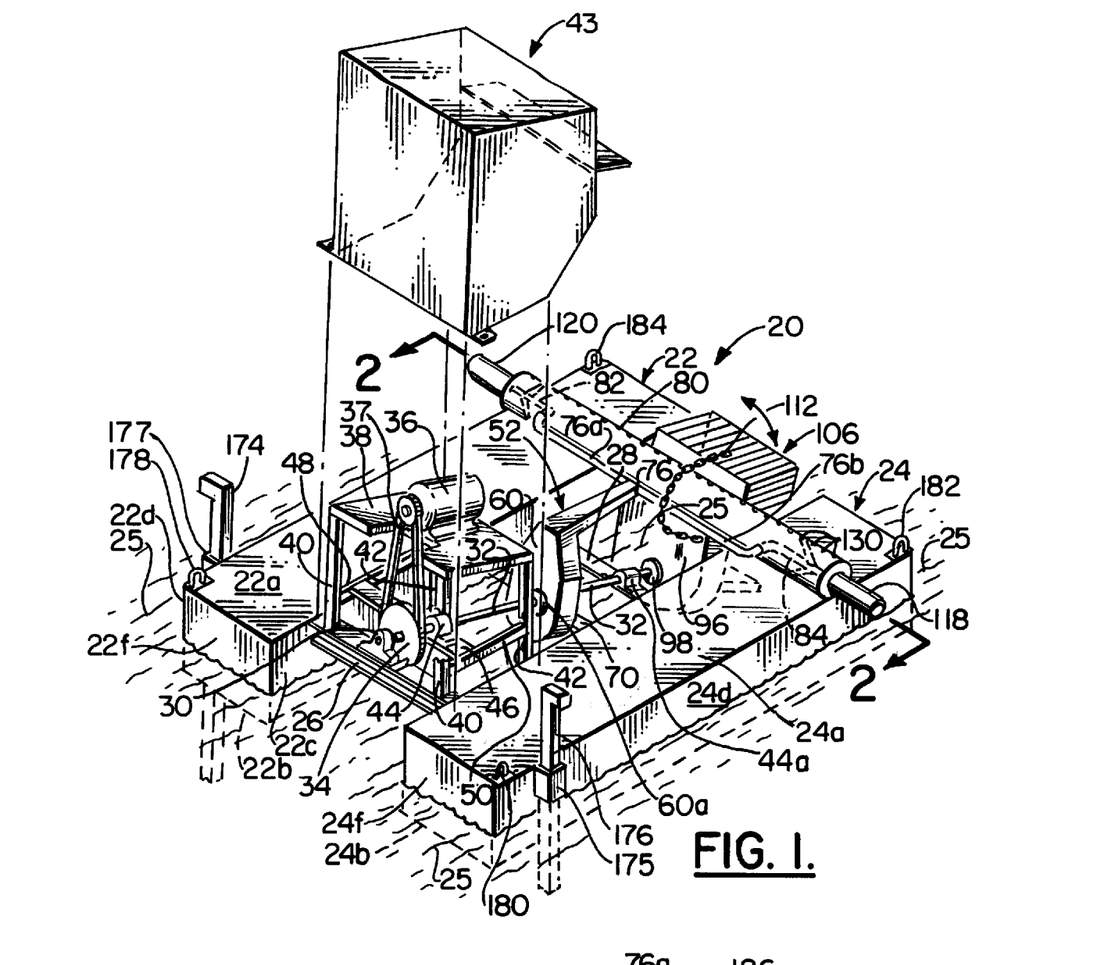
FIG. 1 is a rear perspective view, partly fragmentary, of the aeration apparatus of the invention.

As shown in FIG. 1, a bearing 30 is connected to beam 26 by bolting or the like for rotatable receipt of drive shaft 32. Preferably bearing 30 is a pillow block bearing. A pulley or sheave 34 is rigidly connected to drive shaft 32 for rotatably driving drive shaft 34. Pulley or sheave 34 is driven by motor 36 and drive belt 37. Motor 36 may be an electric motor or any conventional motor or engine such as an internal combustion engine fueled by gasoline, diesel, butane or any other conventional fuel. Motor 36 is mounted at the rear end of apparatus 20.

Figure 10:
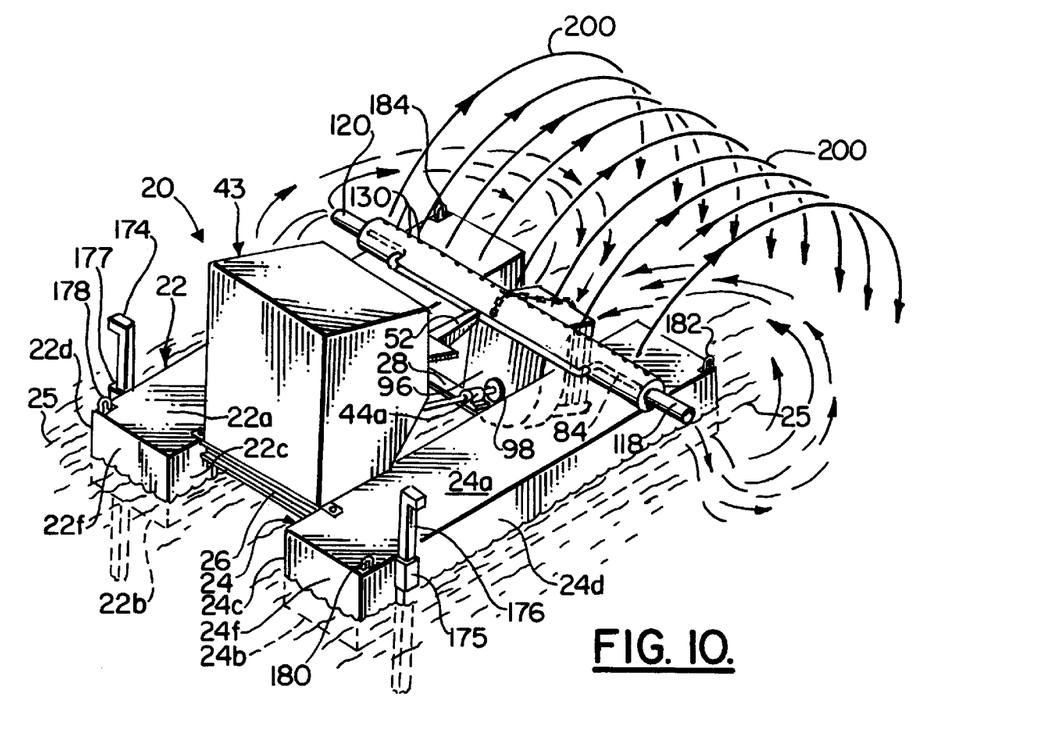
FIG. 10 is a rear perspective view of the aeration apparatus discharge and flow pattern.

Motor 36 is connected to a generally rectangular motor support plate 38. Motor support plate 38 is connected to two vertical legs 40—40 which extend upward from beam 26 and two vertical legs 42—42, one leg 42 being connected to the inside wall 22*c* of pontoon 22, and the other leg 42 being connected to inside wall 24*c* of pontoon 24. Preferably, as shown in FIGS. 1 and 10, a hood generally indicated by the numeral 43 is placed over motor 36 and connected the top walls 22a and 24a of pontoons 22 and 24 to prevent rain from contacting motor 36. If desired, the hood 43 could be connected to the pontoons 22 and 24 by hinges to enable the hood 43 to be tilted away from the motor 36 to service the motor 36 or other equipment under hood 43.

Drive shaft 32 is also rotatably received in two identical self contained bearing assemblies 44 and 44a. Bearing assembly 44 is bolted to bearing support beam 46 and bearing assembly 44a is bolted to beam 28. Bearing support beam 36 is connected at each end thereof to cross beams 48 and 50. Cross-beam 48 is connected at one end thereof to vertical leg 40 as shown in FIG. 1 and at the other end thereof to vertical leg 42. As shown in FIG. 1, cross-beam 50 is connected at one end thereof to vertical leg 40 and at the other end thereof to vertical leg 42.

Figure 3:
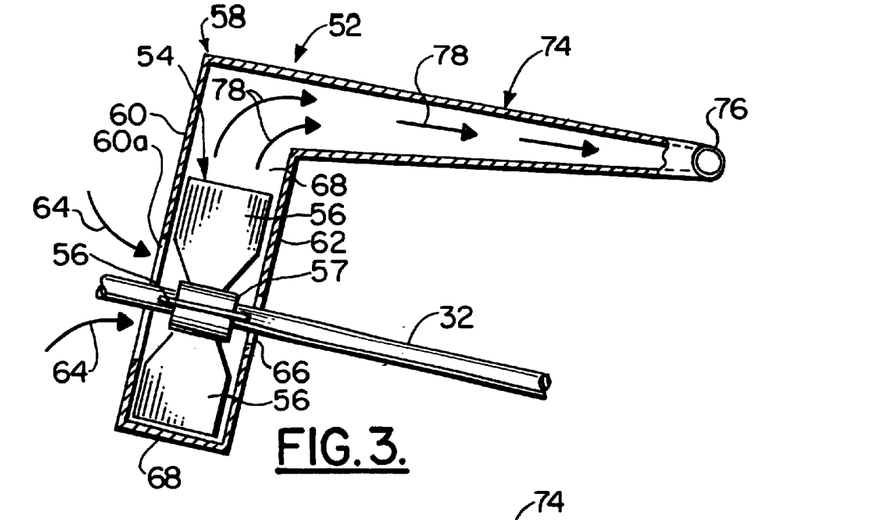
FIG. 3 is an enlarged side sectional view of the air pump or air blower assembly of the invention.
Figure 4:
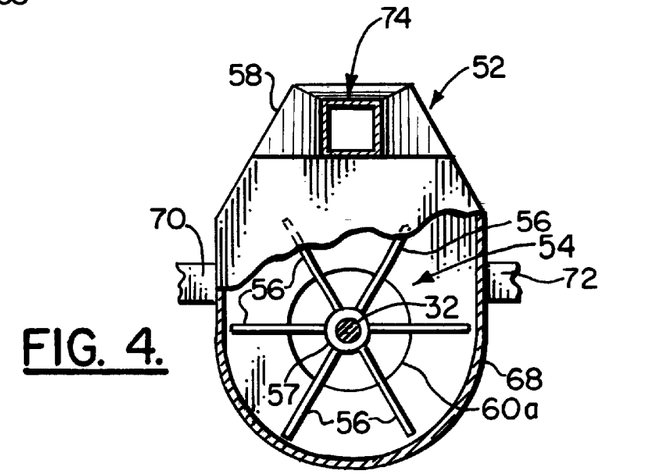
FIG. 4 is an enlarged, partly cut-away, sectional view of the air blower assembly of FIG. 3.
Figure 5:
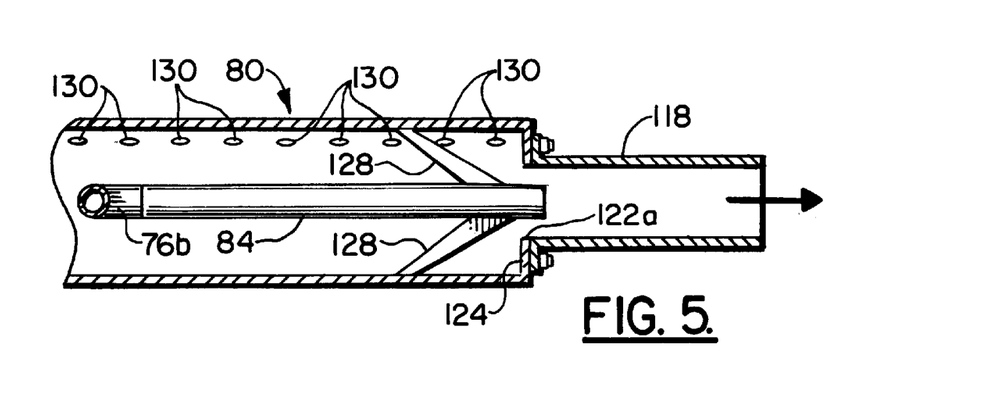
FIG. 5 is a fragmentary sectional rear side view of the discharge manifold assembly of the invention.

Drive shaft 32 extends through the conventional centrifugal air blower or pump generally indicated by the numeral 52 in FIGS. 1, 3, 4 and 10. Centrifugal air blowers such as centrifugal air blower 52 are well known in the art. As shown in FIGS. 3 and 4, the air pump 52 includes an impeller generally indicated by the numeral 54 having a plurality of blades 56 rigidly connected to cylindrical collar 57. Cylindrical collar 57 is rigidly connected to and turns with drive shaft 32.

Impeller 54 and blades 56 are contained in the air blower housing generally indicated by the numeral 58. Air blower housing is located above the surface of the liquids 25 upon which pontoons 22 and 24 float. Air blower housing 58 includes a rear wall 60 and a front wall 62 through which drive shaft 32 extends. Rear wall 60 has an opening 60a therein for induction of air into the interior of air blower housing 58 as indicated by the arrows 64 in FIG. 3. Front wall 62 has an opening 66 therein for receipt of drive shaft 32. A side wall 68 connects front wall 62 to rear wall 66. A beam 70 connects side wall 68 to the inside wall 24c of pontoon 24, and a beam 72 connects side wall 68 to the inside wall 22c of pontoon 22. A tapered air conveying tube generally indicated by the numeral 74 extends from the top of air blower 52 to air distribution tube 76. Air blower housing 58 may contain conventional baffling known in the art as desired to concentrate air flow therethrough.

Tapered air conveying tube 74 conveys air as indicated by the arrows 78 in FIG. 3 to air distribution tube 76. Air distribution tube 76 has two end portions 76a and 76b which are connected to the discharge manifold generally indicated by the numeral 80. Air discharge manifold is rigidly connected to the top walls 22a and 24a of pontoons 22 and 24 by any conventional method such as welding or the like. End portion 76a of air distribution tube 76 is connected to air venturi tube 82 and end portion 76b of air distribution tube 76 is connected to air venturi tube 84.

Figure 2:
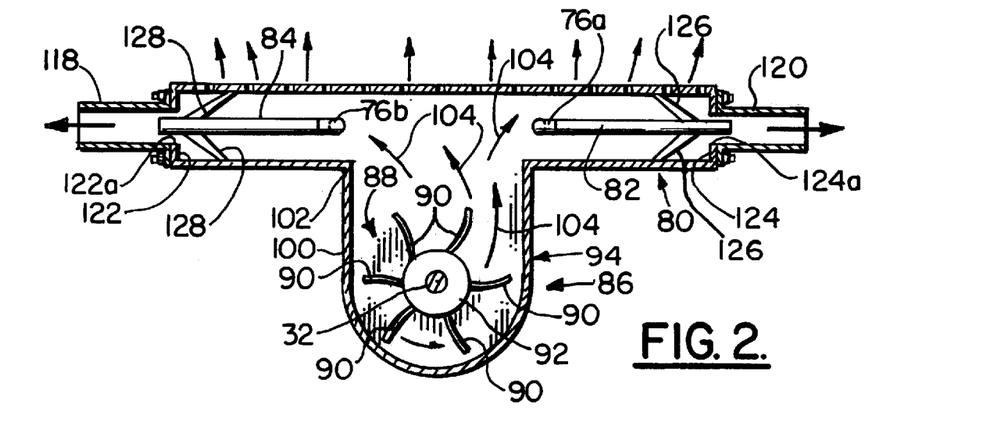
FIG. 2 is an enlarged front sectional view of the discharge pressure manifold and liquid pump assembly of the aeration apparatus of the invention taken along lines 2—2 of FIG. 1.

The forward end of drive shaft 32 is connected to the conventional self-priming centrifugal water or liquid pump generally indicated by the numeral 86 in FIG. 2. Centrifugal water or liquid pumps such as centrifugal liquid pump 86 are well known in the art. As shown in FIG. 2, liquid pump 86 has an impeller generally indicated by the numeral 88 having plurality of blades 90 connected to cylindrical collar 92. Cylindrical collar 92 is rigidly connected to drive shaft 32 and turns with drive shaft 32.

Figure 9:
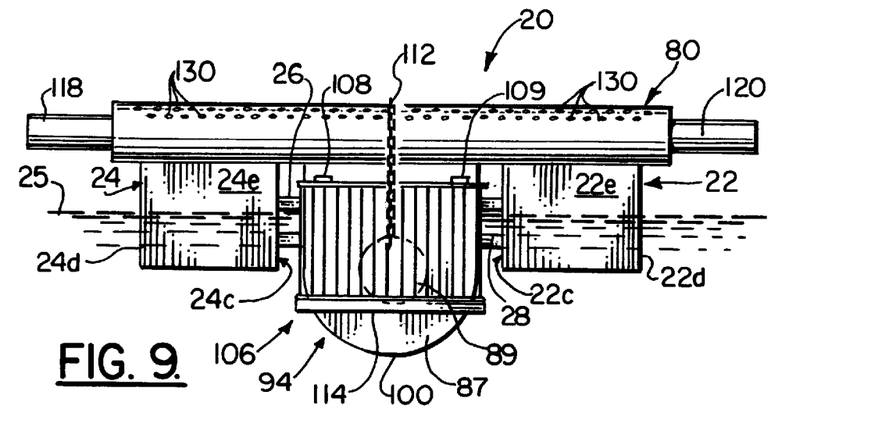
FIG. 9 is a front end view of the aeration apparatus of the invention showing the intake of the pump assembly.
Figure 14:
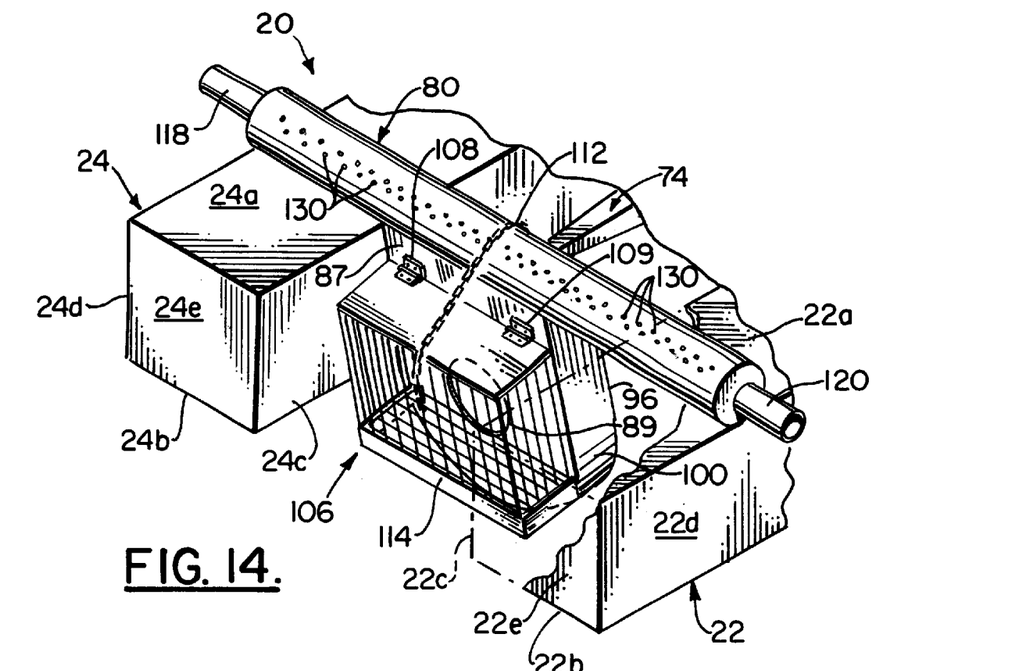
FIG. 14 is a perspective fragmentary view of the front end of the aeration apparatus showing the intake of the pump assembly and showing the intake cage in the operating position.
Figure 15:
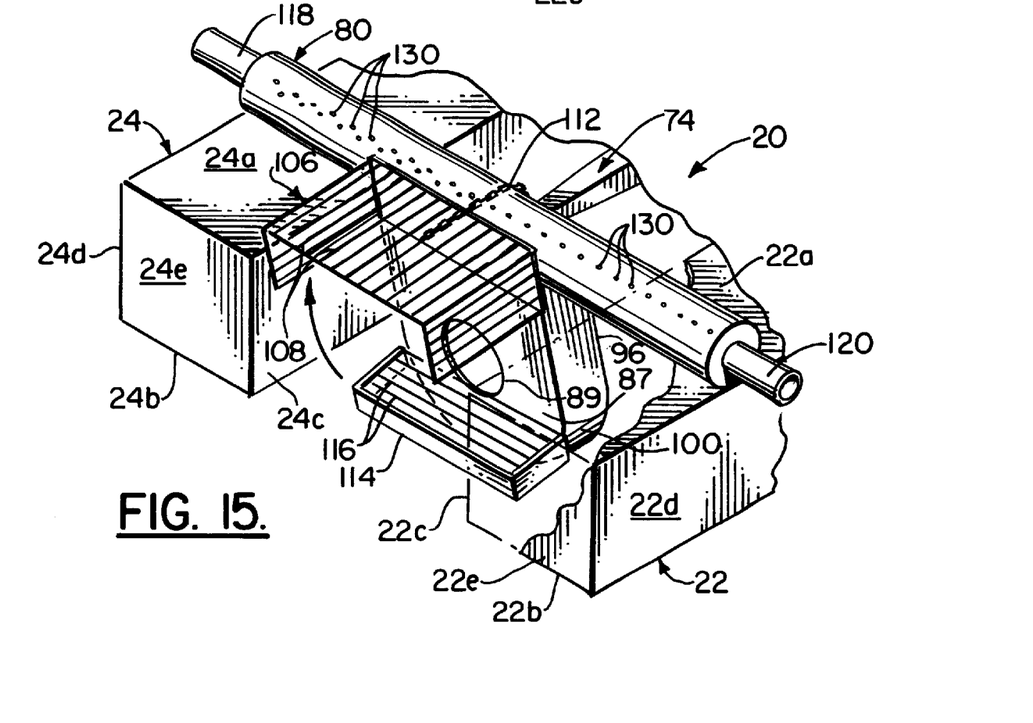
FIG. 15 is a perspective fragmentary view of the front end of the aeration apparatus showing the intake of the pump assembly and showing the intake cage in the raised position.

Impeller 88 and impeller blades 56 are contained in the liquid pump housing generally indicated by the numeral 94 as shown in FIGS. 2 and 9. As shown in FIGS. 9, 14, and 15, liquid pump 86 has a front face plate or wall 87 with an intake port or opening 89 for induction of liquid from the body of liquid being aerated into the interior of liquid pump housing 94. Intake port or opening 89 is located beneath the surface of the body of liquid being aerated as shown in FIG. 9. Liquid pump housing 94 includes a rear wall 96 shown in FIGS. 1, 10, 14, and 15 through which drive shaft 32 extends. A liquid seal 98 shown in FIG. 1 is connected to rear wall 96 to receive drive shaft 32 and form a liquid tight seal therewith. A side wall 100 connects front wall 87 to rear wall 96.

As shown in FIG. 2, liquid pump housing 94 is connected at the upper end 102 thereof to the discharge manifold 80. Liquid pump housing 58 may contain baffling as desired to concentrate liquid flow therethrough. Liquid from liquid pump housing 94 and impeller 88 is conveyed into discharge manifold 80 as indicated by the arrows 104 in FIG. 2.

Preferably, liquid from the reservoir, pond or other body of liquid being aerated will be drawn through a cage generally indicated by the numeral 106 constructed from grating 108 as shown in FIGS. 1, 14, and 15 to prevent large objects such as sticks and logs from entering into intake port or opening 89 or from blocking port 89 and preventing liquid flow therethrough. Cage 106 is connected to front wall 87 of pump housing 94 by hinges 108 and 109. Cage 106 has a lifting chain 112 attached thereto and to manifold 80 to lift cage 106 for ease of cleaning. Cage 106 is shown in the raised position for cleaning in FIGS. 1 and 15, and in the lowered, or operating, position in FIGS. 9, 10, and 14. A horizontal rectangular shelf 114 with grating 116 is rigidly connected front wall 87 of pump housing 94 to form the bottom of cage 106.

The discharge manifold 80 is cylindrical in shape and hollow inside. Discharge manifold 80 has two cylindrical hollow nozzle tubes 118 and 120 connected to each end thereof. Hollow nozzle tubes 118 and 120 are connected by bolting to circular pressure plates 122 and 124 connected at each end of discharge manifold 80. Circular pressure plates 122 and 124 have circular openings 122a and 124a in the center thereof which are smaller in diameter than the inside diameter of cylindrical discharge manifold 80. Hollow nozzle tubes 118 and 120 have the same inside diameter as the openings 122a and 124a in pressure plates 122 and 124. Pressure plates 122 and 124 maintain the back pressure inside discharge manifold higher than the pressure inside hollow nozzle tubes 118 and 120 and cooperate with hollow nozzle tubes 118 and 120 to form nozzles for spraying liquids and air from the outer ends of hollow tubes 118 and 120. Hollow nozzle tubes 118 and 120 aid in mixing air with the liquid exiting therefrom and increase the amount of oxygen dissolved in the liquid. The size of openings 122a and 124a and the inside diameter of hollow nozzle tubes are determined by the horsepower requirement of motor 36.

Venturi tubes 82 and 84 extend through the openings 122a and 124a in pressure plates 122 and 124 and slightly into hollow nozzle tubes 118 and 120 as shown in FIG. 2 and 6–8 and discharge air from air blower 52 into the stream of liquids exiting through hollow nozzle tubes 118 and 120. The lower pressure of the liquid exiting through hollow nozzle tubes creates a venturi effect and greatly increases the efficiency of mixing and dissolving air under pressure from air blower 52 with the liquids exiting from hollow nozzle tubes 118 and 120.

Figure 8:
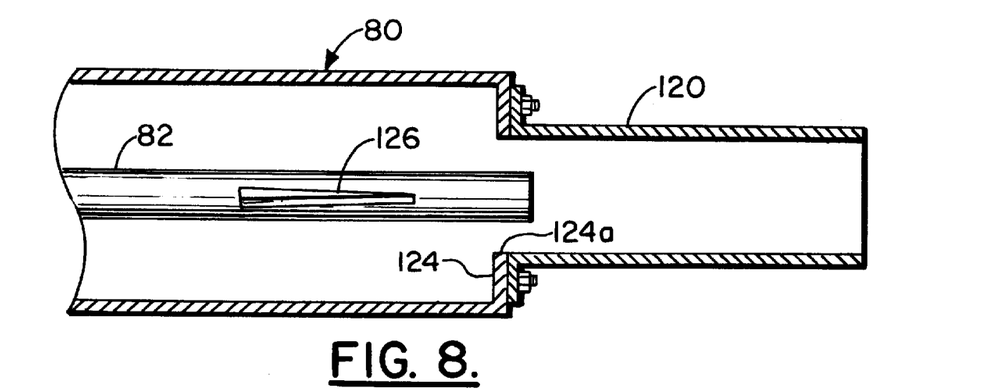
FIG. 8 is an enlarged fragmentary sectional top view of an air venturi tube assembly.
Figure 11:
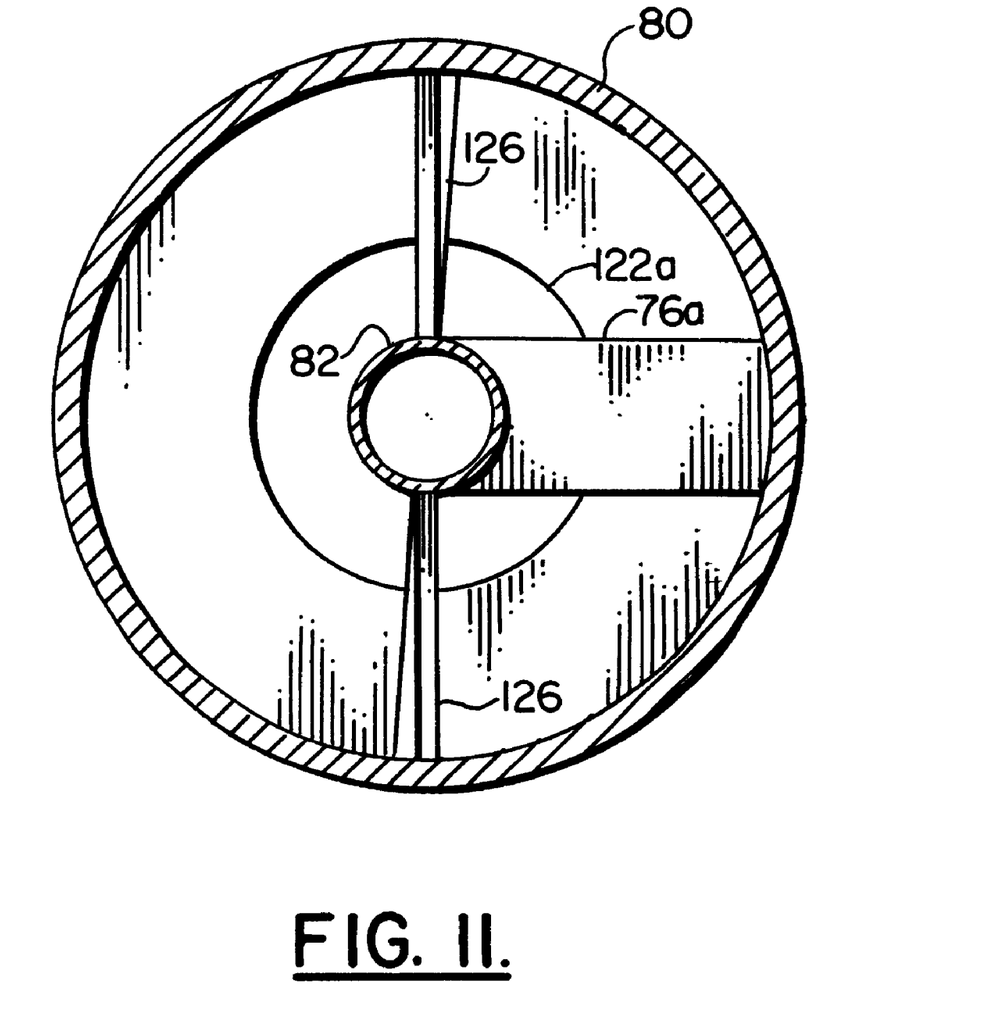
FIG. 11 is an enlarged fragmentary sectional end view of an air venturi tube assembly.

Air venturi tube 82 is supported by directional vanes 126. Directional vanes 126 are connected to air venturi tube 82 and to the inside of discharge manifold 80. Directional vanes 126 are mounted on an approximately 30 degree angle from the horizontal axis of the air venturi tube 82. Directional vanes 126 are turned or spiraled about 22½ degrees to the right of the horizontal axis of the air venturi tube 82 as can be seen in FIGS. 8 and 11.

Figure 6:
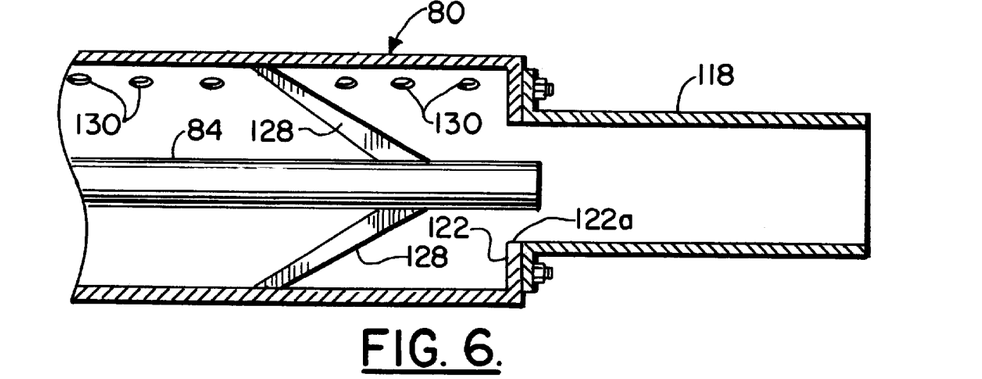
FIG. 6 is an enlarged fragmentary sectional rear side view of an air venturi tube assembly of the invention.
Figure 7:
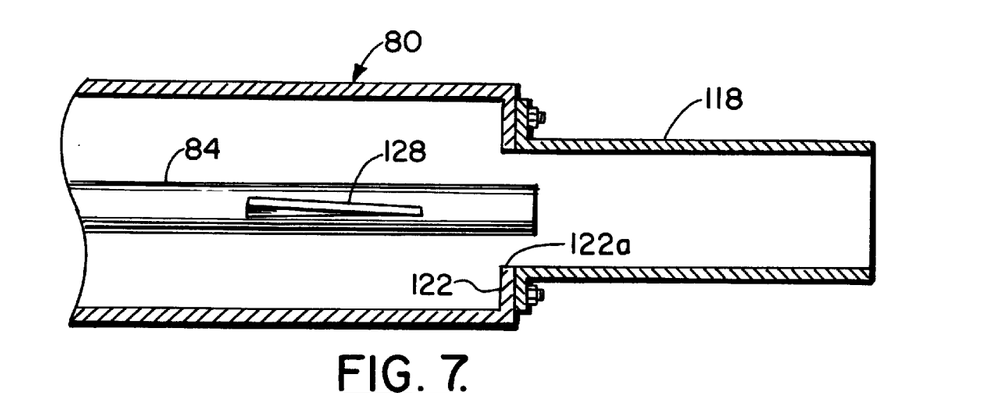
FIG. 7 is an enlarged fragmentary sectional top view of the air venturi tube assembly shown in FIG. 6.

Air venturi tube 84 is supported by directional vanes 128. Directional vanes 128 are connected to air venturi tube 84 and to the inside of discharge manifold 80. Directional vanes 128 are mounted on an approximately 30 degree angle from the horizontal axis of the air venturi tube 84. Directional vanes 128 are turned or spiraled about 22½ degrees to the right of the horizontal axis of the air venturi tube 84 as can be seen in FIGS. 6 and 7.

The directional vanes 126 and 128 make a directional spiraling effect of the liquid being aerated before it is pumped through the openings 122*a* and 124*a* of the pressure plates 122 and 124. The directional spiraling effect of the liquid will encapsulate the air produced discharged from air venturi tubes 82 and 84. The directional spiraling effect of the liquid will reduce the levee or bank erosion by spiraling the liquid away from the levee or bank of the pond, lagoon, basin, and/or reservoir.

As can be seen in FIGS. 1, 5, 6, 9, 10, 14, and 15, discharge manifold 80 has a plurality of holes or openings 130 on the top portion thereof through which water is discharged. Holes or openings 130 are preferably circular holes drilled through discharge manifold 80. The number of holes 130 is dependent on the horsepower requirement of the motor 36. As shown by the arrows in FIG. 10, the liquid is forced through the holes 130 in the discharge manifold 80 creating a high volume spray in the atmosphere. Spraying the liquid in the atmosphere strips the dissolved gases from the liquid. Oxygen is dissolved in the liquid as the small droplets fall to the surface of the liquid being aerated. This action creates a circular movement of the liquid to be aerated as shown by the arrows labled 200 in FIG. 10. The discharge from discharge manifold 80 will be from holes 130 and from hollow nozzle tubes 118 and 120 as shown in by the arrows in FIG. 10.

The major oxygen transfer to the liquid is accomplished prior to the liquid leaving the hollow nozzle tubes 118 and 120. However, some oxygen is dissolved into the liquid discharged from discharge manifold 80 from the splashing effect of the liquid and meeting the surface of the liquid to be aerated. The force and volume of the liquid creates a circular mixing effect of the liquid.

Figure 12:
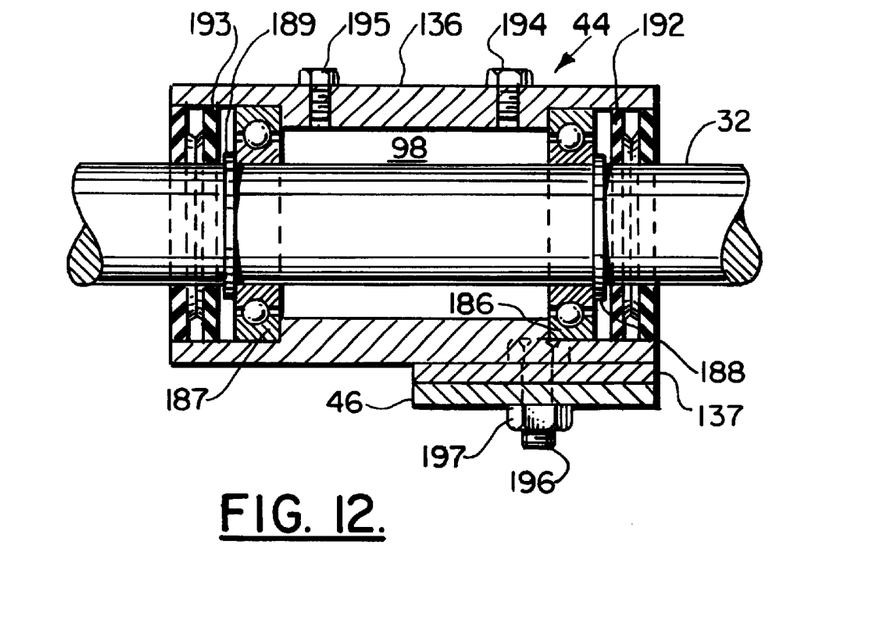
FIG. 12 is an enlarged side sectional view of the self-contained bearing assembly of the invention.
Figure 13:
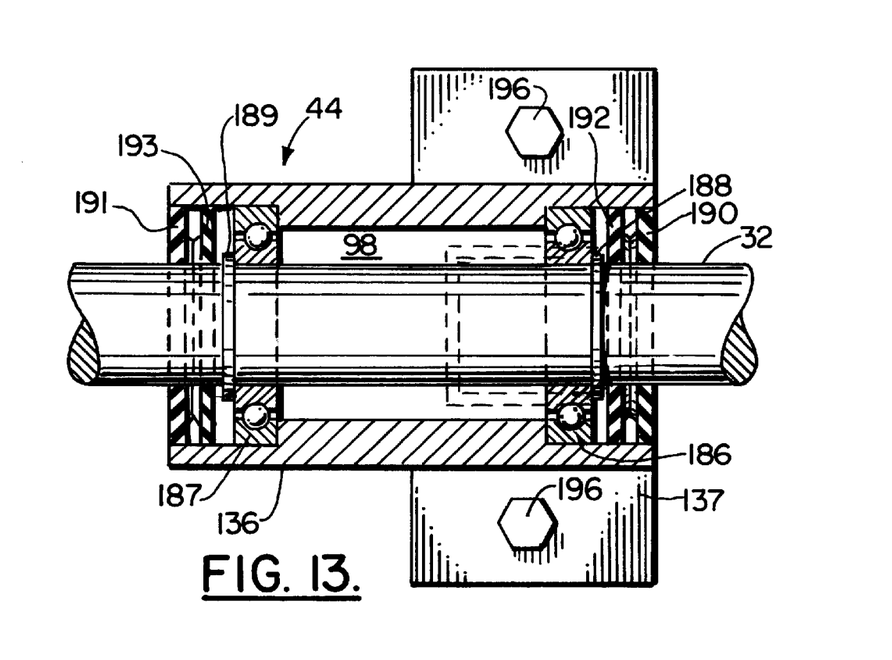
FIG. 13 is an enlarged top sectional view of the self-contained bearing assembly of the invention.

The self contained bearing assemblies 44 and 44*a* are shown in detail in FIGS. 12 and 13. Since the bearing assemblies 44 and 44*a* are identical, only bearing 44 will be described in referring to FIGS. 12 and 13. Referring now to FIGS. 12 and 13, bearing assembly 44 has a hollow bearing housing 136 which has two load bearings 186 and 187 on either end thereof which rotatably receive drive shaft 32. The load bearings 186 and 187 are held in position by two load bearing snap rings 188 and 189 which are located in circular slots on drive shaft 32. Housing 136 has two inner seals 192 and 193 and two outer seals 190 and 191 which hold grease or oil in lubrication reservoir 98 and keep load bearings 186 and 187 lubricated. Seals 190, 191, 192, and 193 keep any liquids or other contaminants from entering the load bearings 186 and 187 and the lubrication reservoir 198.

Housing 136 has two threaded plugs 194 and 195 for filling the lubrication reservoir 98 and keeping any contaminants from entering reservoir 98. Bearing housing 136 is secured to the bearing mounting plate 137. The bearing mounting plate 137 is connected to beam 46 by bolt 196 and nut 197.

The self contained bearing assembly is instrumental in keeping drive shaft 32 from moving laterally and provides exceptional load distribution to drive shaft 32, in addition to being low in maintenance.

The aeration apparatus 20 is preferably positioned perpendicular to a bank or a levee. As shown in FIG. 1, aeration apparatus 20 has sliding mounting legs 174 and 176 extending vertically through mounting leg brackets 175 and 177 connected to walls 22*d* and 24*d* of pontoons 22 and 24. The mounting legs 174 and 176 can be driven into the bottom of the pond, lagoon, basin, reservoir or other body of liquid in which aeration apparatus is located. Most changes in the elevation of the liquid will be overcome by the apparatus 20 floating up and down and being guided by the mounting legs 174 and 176 in the mounting leg brackets 175 and 177.

A second method of installation of apparatus 20 is to attach cables to the cable brackets 178, 180, 172, and 184 and secure the cables to the levee or bank or secure the cables to positioning anchors. This method of installation is used to preserve the integrity of bottom of the pond, lagoon, basin, and/or reservoir if a liner is present.

In a field test of the apparatus 20 of the invention in a catfish pond utilizing a 15 horsepower electric motor as motor 36, the rate of transfer of oxygen to the water in the catfish pond was 8.4 pounds of oxygen per horsepower hour.

Although the preferred embodiments of the invention have been described in detail above, it should be understood that the invention is in no sense limited thereby.

What is claimed is:

1. An aeration and mixing apparatus comprising:
   a. a plurality of pontoons for floating said apparatus upon the surface of the liquid being aerated,
   b. a generally cylindrical manifold connected to said pontoons for receiving liquids to be aerated and for spraying liquids therefrom, said manifold having at least two nozzles for spraying liquids therefrom, said manifold having an air venturi tube therein for each of said nozzles, each of said air venturi tubes extending into one of said nozzles and spraying air under pressure into the liquids being discharged from said nozzle, each of said air venturi tubes having a plurality of vanes thereon which cause liquids flowing therearound to swirl in a spiral direction prior to discharge from said nozzle in which said air venturi tube is located, said manifold having a plurality of openings in the top portion thereof for spraying liquids under pressure in said manifold therethrough to the exterior of said manifold,
   c. a liquid pump connected to said pontoons which supplies liquids under pressure to said manifold,
   d. an air pump connected to said pontoons which supplies air under pressure to said air venturi tubes in said manifold, and
   e. a motor connected to said pontoons which drives said liquid pump and said air pump.

2. The apparatus of claim 1 wherein said apparatus has two pontoons.

3. The apparatus of claim 2 wherein each of said pontoons has a movable leg connected thereto for driving into the bottom of the body of liquid upon which said pontoons are floating to anchor said apparatus to said bottom.

4. The apparatus of claim 3 wherein said pontoons have brackets thereon for receiving lines or cables for anchoring said apparatus to the bottom of the body of liquid upon which said pontoons are floating.

5. The apparatus of claim 1 wherein said liquid pump is contained in a liquid pump housing and said liquid pump housing is connected to said manifold.

6. The apparatus of claim 5 wherein said liquid pump housing has a liquid inlet through which liquids flow to said pump, said liquid inlet having a cage connected thereto for prevent floating objects from entering said inlet.

7. The apparatus of claim 6 wherein said cage is connected to said pump housing by hinges which enable said cage to be raised from said inlet for cleaning of said cage and inlet.

8. The apparatus of claim 1 wherein said motor drives a drive shaft which is connected to said liquid pump and said air pump for driving said liquid pump and said air pump.

9. The apparatus of claim 8 wherein said drive shaft is rotatably received in at least one self-contained water resistant bearing assembly connected to said pontoons.

10. The apparatus of claim 9 wherein said bearing assembly has a housing having two ends, said drive shaft extending through both of said two ends, each of said two ends having two parallel circular lubricant seals therein which receive said drive shaft therethrough, each of said two ends having two load supporting bearings therein on the inside of said seals which receive said drive shaft therethrough.

11. The apparatus of claim 10 wherein said housing has at least one removable plug therein for filling said housing with lubricant.

12. The apparatus of claim 1 wherein said liquid pump is located beneath the surface of the liquid upon which said pontoons float.

13. The apparatus of claim 12 wherein said air pump is located above the surface of the liquid upon which said pontoons float.

14. The apparatus of claim 13 wherein said manifold is connected to the top side of said pontoons.

15. The apparatus of claim 14 wherein said air pump is connected to said manifold.

16. The apparatus of claim 1 wherein said manifold has two nozzles connected thereto, one of said nozzles being connected at one end of said manifold and the other nozzle being connected at the other end of said manifold.

17. The apparatus of claim 16 wherein said two nozzles are axially aligned with the central axis of cylindrical manifold.

18. An aeration and mixing apparatus comprising:

a. a plurality of pontoons for floating said apparatus upon the surface of the liquid being aerated, b. a generally cylindrical manifold means connected to said pontoons for receiving liquids to be aerated and for spraying liquids therefrom, said manifold means having at least two nozzle means for spraying liquids therefrom, said manifold means having an air venturi tube means therein for each of said nozzle means for spraying air, each of said air venturi tube means extending into one of said nozzle means and spraying air under pressure into the liquids being discharged from said nozzle means, each of said air venturi tube means having a plurality of vane means thereon for causing liquids flowing therearound to swirl in a spiral direction prior to discharge from said nozzle means in which said air venturi tube means is located, said manifold means having a plurality of opening means in the top portion thereof for spraying liquids under pressure in said manifold means therethrough to the exterior of said manifold means, c. a liquid pump means connected to said pontoons for supplying liquids under pressure to said manifold means, d. an air pump means connected to said pontoons for supplying air under pressure to said air venturi tube means in said manifold means, and e. a motor means connected to said pontoons for driving said liquid pump means and said air pump means.

19. A method for aeration comprising:

a. pumping liquids to be aerated into a hollow generally cylindrical manifold, b. providing nozzles on said manifold and openings in the top of said manifold for spraying said liquids to be aerated therefrom, c. swirling said liquids in a spiral direction prior to said liquids reaching said nozzles, d. injecting air under pressure into said nozzles prior to discharge of said liquids to be aerated from said nozzles, and e. discharging said liquids through said nozzles and said openings from the interior of said manifold to the exterior of said manifold.

20. The method of claim 19 wherein said nozzles are two in number, one of said nozzles being located at one end of said generally cylindrical manifold and the other of said nozzles being located at the other end of said generally cylindrical manifold.

* * * * *